(12) United States Patent
Zaitseva et al.

(10) Patent No.: US 10,647,914 B2
(45) Date of Patent: May 12, 2020

(54) DEFECT-RESISTANT PLASTIC SCINTILLATION RADIATION DETECTOR COMPOSITIONS AND FABRICATION METHODS

(71) Applicant: Lawrence Livermore National Security, LLC, Livermore, CA (US)

(72) Inventors: Natalia P. Zaitseva, Livermore, CA (US); M. Leslie Carman, San Ramon, CA (US); Andrew M. Glenn, Livermore, CA (US); Andrew Neil Mabe, Livermore, CA (US); Stephen A. Payne, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 389 days.

(21) Appl. No.: 15/462,512

(22) Filed: Mar. 17, 2017

(65) Prior Publication Data
US 2018/0265775 A1    Sep. 20, 2018

(51) Int. Cl.
*C09K 11/02* (2006.01)
*C09K 11/06* (2006.01)
*G01T 1/203* (2006.01)

(52) U.S. Cl.
CPC ............ *C09K 11/025* (2013.01); *C09K 11/06* (2013.01); *G01T 1/2033* (2013.01)

(58) Field of Classification Search
CPC ...... C09K 11/02; C09K 11/06; G01T 1/20333
See application file for complete search history.

(56) References Cited

U.S. PATENT DOCUMENTS

| 2014/0332689 A1* | 11/2014 | Van Loef | G01T 3/06 250/362 |
| 2015/0028217 A1* | 1/2015 | Zaitseva | G21K 4/00 250/361 R |
| 2016/0017220 A1* | 1/2016 | Hamel | C08F 212/08 250/362 |

OTHER PUBLICATIONS

Bagan et al, "Crosslinked plastic scintillators: A new detection system fir radioactive measurement in organic and aggressive media", Analytica Chimica Acta 852, Oct. 18, 2014, pp. 13-19.*

(Continued)

*Primary Examiner* — C Melissa Koslow
(74) *Attorney, Agent, or Firm* — Zilka-Kotab

(57) ABSTRACT

Scintillating plastics resistant to crazing and fogging, methods of making and using the same are disclosed. The scintillating plastics include: one or more primary polymers present in an amount ranging from about 40 wt % to about 95 wt %; one or more secondary polymers present in an amount ranging from about 1 wt % to about 60 wt %; and one or more fluors present in an amount ranging from about 0.1 wt % to about 50 wt %. Methods of making such plastics include: creating a homogenous mixture of precursor materials including primary polymer, secondary polymer, and fluor in the amounts set forth above; and polymerizing the homogenous mixture. Methods of using such plastics include: exposing the scintillating plastic to one or more extreme environmental conditions for a predetermined amount of time without generating crazing or fogging within the scintillating plastic. Various additional features and specific embodiments of these inventive concepts are also disclosed.

17 Claims, 4 Drawing Sheets

(56) References Cited

OTHER PUBLICATIONS

Cameron et al, "Fogging in Polyvinyl Toluene Scintillators", IEEE Transactions on Nuclear Science, vol. 62, No. 1, Feb. 1, 2015, pp. 368-371.*

Cameron et al. "Fogging in Polyvinyl Toluene Scintillators," IEEE Transactions on Nuclear Science, vol. 62, No. 1, 2015, pp. 368-371.

* cited by examiner

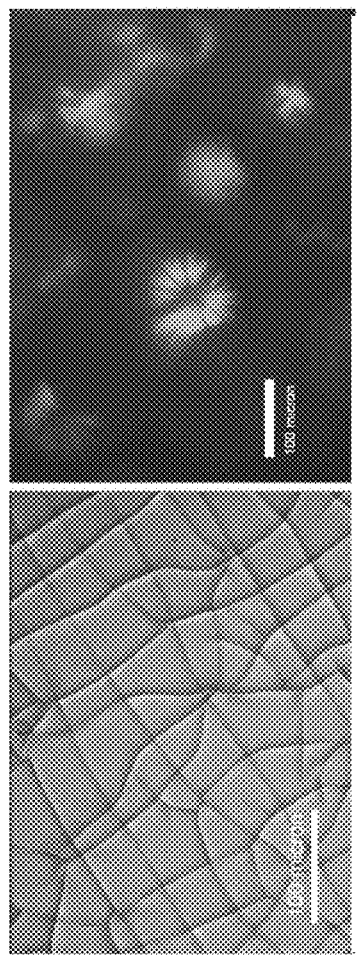
FIG. 1A (prior art)
FIG. 1B (prior art)
FIG. 1C (prior art)
FIG. 2A (prior art)
FIG. 2B (prior art)

DEFECT-RESISTANT PLASTIC SCINTILLATION RADIATION DETECTOR COMPOSITIONS AND FABRICATION METHODS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to plastic scintillation radiation detector compositions, techniques for forming the same, and techniques for restoring the detection capability and sensitivity of plastic scintillation radiation detectors that exhibit surface and/or bulk defects arising from crazing and/or fogging following exposure to extreme environmental conditions such as temperature variation and/or water vapor.

BACKGROUND

Conventional plastic scintillator optics generally comprise a bulk plastic material that is preferably transparent to ultraviolet or visible light generated by incident ionizing radiation of types to be detected using the scintillator device. The most common of such materials include polystyrene (PS) and polyvinyl toluene (PVT) owing to the well-known and desirable optical properties of such materials in the context of use in a scintillation radiation detector.

However, as is also known in the art, such conventional materials tend to degrade over time with exposure to environmental conditions such as water vapor and/or significant temperature changes. Most notably, and as shown in FIGS. 1A-1C and 2A-2B, a conventional detector may be substantially transparent and suitable for use in detecting radiation of interest following fabrication (FIG. 1A), but following exposure to undesirable environmental conditions surface defects may arise via a process known as "crazing" (FIGS. 1B, 2A) and even more detrimentally defects may form in the bulk volume of the optic, a phenomenon known as "fogging" (FIGS. 1C, 2B). Each type of defect causes scattering of light incident upon the surface of and/or propagating through the detector bulk, undesirably reducing the sensitivity of the detector and ultimately defeating the ability to detect the radiation of interest.

Accordingly, conventional wisdom is to avoid exposing the detector to the undesirable environmental conditions, thereby avoiding the reduction or loss of detection capability. However, this precludes the use of such detectors in environments where radiation detection may be necessary, particularly via prolonged observation over a long period of time.

In addition, there is no currently-known method for restoring the functionality of detectors exhibiting crazing and/or fogging.

Accordingly, it would be useful to provide systems and techniques that minimize or eliminate occurrence of crazing and fogging within plastic scintillation radiation detectors exposed to environmental conditions known to cause such defects, as well as to reverse the negative impact caused by such exposure.

SUMMARY

According to one embodiment, a scintillating plastic is resistant to crazing and fogging. The scintillating plastic includes: one or more primary polymers present in an amount ranging from about 40 wt % to about 95 wt %; one or more secondary polymers present in an amount ranging from about 1 wt % to about 60 wt %; and one or more fluors present in an amount ranging from about 0.1 wt % to about 50 wt %.

According to another embodiment, a method of forming a scintillating plastic that is resistant to crazing and fogging includes: creating a homogenous mixture of precursor materials comprising: one or more primary polymers present in an amount ranging from about 40 wt % to about 99 wt %; one or more secondary polymers present in an amount ranging from about 1 wt % to about 60 wt %; and one or more fluors present in an amount ranging from about 0.1 wt % to about 50 wt %; and polymerizing the homogenous mixture.

According to yet another embodiment, a method includes: exposing a scintillating plastic to one or more extreme environmental conditions for a predetermined amount of time without generating crazing or fogging within the scintillating plastic.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 1A is a photographic image of a conventional plastic scintillation radiation detector, prior to exposure to environmental conditions known to cause crazing and/or fogging.

FIG. 1B is a photograph of the conventional scintillator as shown in FIG. 1A following exposure to environmental conditions known to cause crazing.

FIG. 1C is a photograph of the conventional scintillator as shown in FIG. 1A following exposure to environmental conditions known to cause fogging.

FIG. 2A is a SEM image of surface defects on a surface of a conventional scintillator such as shown in FIG. 1B.

FIG. 2B is an image of bulk defects on a surfaces of a conventional scintillator such as shown in FIG. 1C.

DETAILED DESCRIPTION

Figures 3A, 3B, 3C, 3D, 3E:
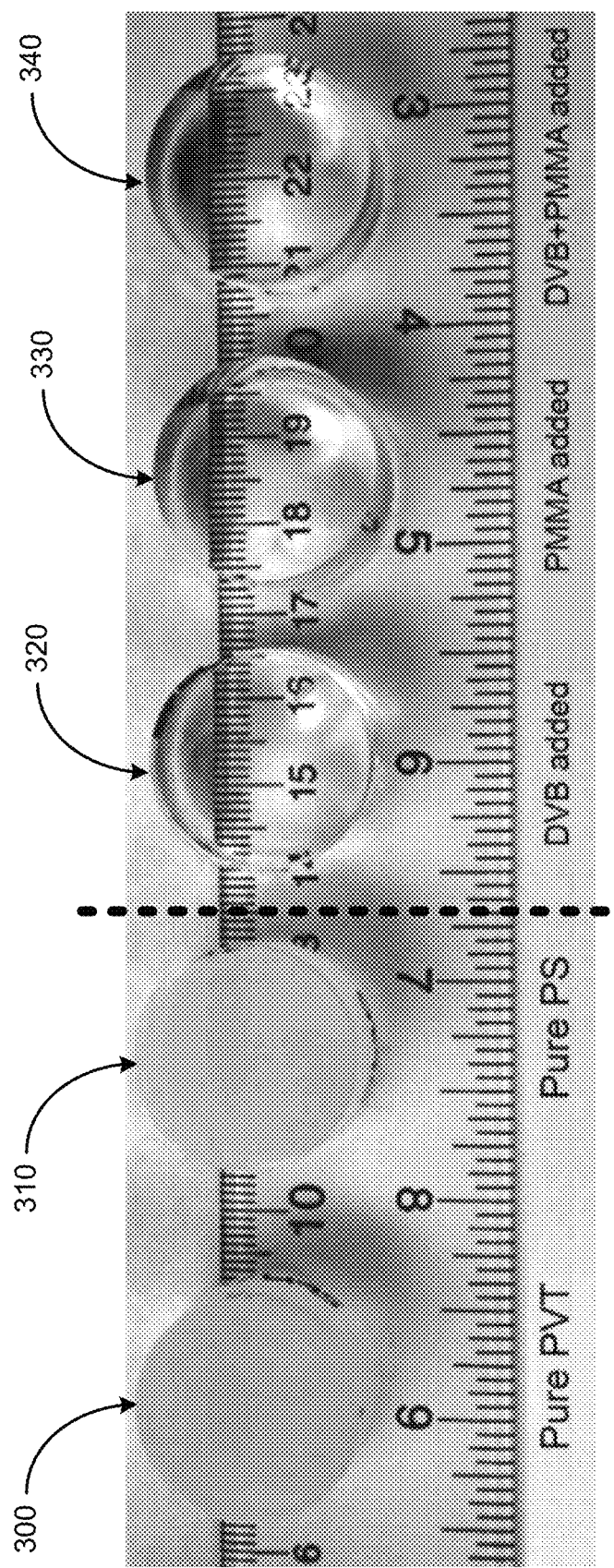
FIGS. 3A-3E are images of conventional (3A-3B) and inventive (3C-3E) plastic scintillation radiation detector compositions following exposure to environmental conditions known to cause crazing and/or fogging.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following descriptions refers to "plastics," "optics," "detector materials," "detector compositions", "scintillators," etc. interchangeably. All such recitations shall be understood as referring to a material comprising one or more polymers and one or more fluors arranged in a manner so as to convey the ability to detect radiation of interest (e.g. gamma radiation) incident on the material. In general, such detection is accomplished via scintillation, in which a photon having a wavelength of interest is absorbed and another photon (having the same wavelength or perhaps a shifted wavelength, depending on fluor) is subsequently emitted by the detector material.

The following description discloses several preferred embodiments of plastic scintillation radiation detectors, and more particularly, this invention relates to compositions of plastic scintillation radiation detectors that resist or prevent the formation of surface and/or bulk defects during/following exposure to extreme environmental conditions, as well as related methods of making and using such materials.

According to one general embodiment, a scintillating plastic is resistant to crazing and fogging. The scintillating plastic includes: one or more primary polymers present in an amount ranging from about 40 wt % to about 95 wt %; one or more secondary polymers present in an amount ranging from about 1 wt % to about 60 wt %; and one or more fluors present in an amount ranging from about 0.1 wt % to about 50 wt %.

According to another general embodiment, a method of forming a scintillating plastic that is resistant to crazing and fogging includes: creating a homogenous mixture of precursor materials comprising: one or more primary polymers present in an amount ranging from about 40 wt % to about 99 wt %; one or more secondary polymers present in an amount ranging from about 1 wt % to about 60 wt %; and one or more fluors present in an amount ranging from about 0.1 wt % to about 50 wt %; and polymerizing the homogenous mixture.

According to yet another general embodiment, a method includes: exposing a scintillating plastic to one or more extreme environmental conditions for a predetermined amount of time without generating crazing or fogging within the scintillating plastic.

As noted above, conventional plastic scintillation radiation detector compositions typically employ a bulk plastic comprising polystyrene or polyvinyl toluene doped with appropriate fluor(s). However, such formulations must be protected against exposure to environmental conditions such as high humidity; cold temperatures; extreme temperature swings; or combinations thereof, because these "extreme" conditions cause the scintillator plastic to form surface defects via crazing and bulk defects via fogging. Both varieties of defect undesirably cause scattering of light incident upon and/or propagating through the optic, resulting in degradation of the optic performance (e.g. detection sensitivity).

Exemplary conditions falling within the scope of "extreme" in the context of the present disclosures include any environmental conditions that cause formation of surface and/or bulk defects in a plastic scintillator optic comprising either polystyrene, polyvinyl toluene, or equivalent polymers as would be appreciated by a person having ordinary skill in the art upon reading these descriptions.

For instance, in accordance with various illustrative embodiments, exposing the scintillator to extreme environmental conditions may include: (1) exposing the scintillator to a rapid change in temperature, e.g. a change of about 20° C. or more in a period of about 24 hours together with high humidity (greater than about 70%); and then (2) exposing the scintillator to approximately freezing temperatures for a period of several (e.g. 3-5) hours or more.

Exposure of conventional plastic scintillators is a process that may occur over a period of several months, however defects arising from fogging may appear following exposure of the scintillator to appropriate environmental conditions for a duration of only several hours or less. For example, in one embodiment extreme environmental conditions including exposure to humidity in an amount of about 70% or more for at least 2 hours, coupled with a temperature swing of about 25° C. to about 55° C. or more causes fogging. In more embodiments, extreme environmental conditions including exposure to humidity in an amount of about 70% or more for at least 24 hours is sufficient to cause fogging. The inventive formulations disclosed herein are resistant to fogging under such conditions.

The precise kinetics of the crazing and fogging processes are not well understood at this time, but regardless of the rate of defect formation it will be understood that the presently disclosed inventive compositions are characterized by substantially improved resistance to formation of surface and/or bulk defects under environmental conditions that would cause conventional compositions such as polystyrene and/or polyvinyl toluene to form such defects, regardless of duration or precise temperature, humidity, etc. causing the defects to form in the conventional compositions. Put another way, the scintillating plastics described herein are structurally characterized by a substantial absence of surface defects causing crazing and bulk defects causing fogging following exposure of the scintillating plastic, for a predetermined amount of time, to extreme environmental conditions including but not limited to humidity and temperature. Such structural defects, or substantial absence thereof, may be observed using any suitable device or technology available and known to skilled artisans, ranging in complexity from simple optical inspection to high-resolution imaging such as scanning electron microscopy.

For instance, according to preferred embodiments the presently disclosed inventive plastic scintillator compositions are substantially stable against formation of surface and bulk defects within a temperature range of about −40° C. to about 55° C. and a corresponding relative humidity in a range from about 0-100%. Accordingly, in preferred embodiments and after exposing the scintillating plastic to the one or more extreme environmental conditions, an initial (i.e. pre-exposure) detection efficiency of the scintillating plastic is unchanged.

In certain applications such radiation detectors are operated outside in ambient weather condition, for which it may be impossible to avoid extreme environmental conditions.

Since the primary factor in longevity of scintillation radiation detectors is the quality of the scintillator optic, such detectors should operate at peak efficiency for as long as possible to minimize the expense associated with monitoring and scintillator replacement. Accordingly, there is a need for techniques and associated systems configured to detect radiation of interest under extreme or harsh environmental conditions over a long period of time (e.g. several decades), without degradation of the detector performance via crazing and fogging.

The presently disclosed inventive concepts address this need by proposing novel detector plastic compositions. In particular, by adding secondary polymeric components or molecular additives to a plastic scintillation radiation detector comprising polyvinyl toluene or polystyrene as the primary polymer component results in a high-quality optic that does not experience crazing or fogging under environmental conditions that caused crazing and fogging in otherwise identical optics lacking the secondary polymeric component(s) or molecular additive(s). This difference is most clearly and simply demonstrated, according to three exemplary embodiments, via comparing the optical appearance of the conventional compositions shown in FIGS. 3A-3B versus to optical appearance of the inventive compositions shown in FIGS. 3C-3E. Notably, all of the plastics shown in FIGS. 3A-3E were subjected to identical environmental conditions including high humidity followed by freezing temperature.

Skilled artisans will appreciate that the opaque appearance of the pure polyvinyl toluene optic 300 shown in FIG. 3A and the pure polystyrene optic 310 shown in FIG. 3B are the result of light scattering after interaction with surface and/or bulk defects, particularly the latter. Conversely, the transparency of the inventive optics 320, 330 and 340 as shown in FIGS. 3C-3E indicates a lack of any such defects or scattering.

The optics shown in FIGS. 3A-3E were prepared using identical techniques and differ only in the inclusion/exclusion of secondary polymeric compounds. Similarly, all optics shown in FIGS. 3A-3E were exposed to identical environmental conditions, namely several cycles of including: (1) exposure to an environment of saturated water vapor incubated at 50° C.; (2) rapid cooling to −20° C.; and (3) return to ambient temperature and humidity. The optic 320 depicted in FIG. 3C includes polyvinyl toluene as a primary polymer and divinyl benzene (DVB) as a secondary polymer; while the optic 330 depicted in FIG. 3D includes polyvinyl toluene as a primary polymer and polymethylmethacrylate (PMMA) as a secondary polymer; and optic 340 depicted in FIG. 3E includes polyvinyl toluene as a primary polymer and both DVB and PMMA as secondary polymers. Similar effects were observed in embodiments employing polystyrene as the primary polymer.

The inventive embodiments detailed herein generally exhibit an impressive improvement in plastic stability, which in preferred approaches may be achieved by additions of 1-60% of divinylbenzene (DVB), polymethylmethacrylate (PMMA), or mixtures thereof to traditional polyvinyl toluene-based or polystyrene-based polymer matrices. Of course, it should be understood that primary polymers other than polyvinyl toluene or polystyrene may be employed without departing from the scope of the present disclosures, as may be secondary polymers other than DVB and/or PMMA.

For instance, in various embodiments, α-methylstyrene, dimethylstyrene, and/or trimethylstyrene may be included or employed as the primary polymer. Preferably, the primary polymer includes one or more phenyl rings.

Similarly, various embodiments may employ as the secondary polymer one or more of: additional polymers, copolymers, monomers, crosslinkers, and/or certain molecular additives.

Preferably, the secondary polymers are characterized by a molecular composition including oxygen. For instance, in one approach secondary polymers may include acrylic acid and/or derivatives thereof (e.g., methyl acrylate, ethyl acrylate, poly(propylene acrylate, etc.), methacrylic acid and/or derivatives thereof (methyl methacrylate (PMMA), ethyl methacrylate, poly(propylene glycol) methacrylate, etc.), and/or oxygen-bearing allyl analogs (e.g., allyl acetate, allyl ethyl ether, vinyl ether, etc.). Of course, other secondary polymer components that would be understood as equivalent to any of the foregoing by a person having ordinary skill in the art upon reading the present descriptions may also be employed without departing from the scope of the inventive concepts set forth herein.

Molecular additives included at effective concentrations and containing oxygen or nitrogen atom(s) within their structure, such as PPO (2,5-diphenyl-oxazole), have also been discovered to render the plastic resistant to fogging and/or crazing for effective concentrations on the order of 10 wt %. For the case of PPO, this dye is advantageously both highly fluorescent as well as highly soluble in the primary polymer/polymeric matrix.

Further still, and with particular reference to crosslinker secondary polymer components, DVB, ethylene glycol diacrylate or derivatives thereof, and/or ethylene glycol dimethacrylate or derivatives thereof, may be employed in accordance with several illustrative embodiments.

Of course, combinations of acrylic acid and/or derivatives thereof, methacrylic acid and/or derivatives thereof, oxygen-bearing allyl analogs, ethylene diacrylate and/or derivatives thereof, ethylene glycol dimethacrylate and/or derivatives thereof, DVB, PMMA, and/or other secondary polymers as well as certain soluble molecular species (such as PPO) described herein may be employed in any combination without departing from the scope of the inventive concepts presently disclosed. Preferably, either or both of the primary and secondary polymers, and various constituents thereof, are or include aromatic polymers. Without wishing to be bound to any particular theory, the inventors postulate a possible mechanism accounting for the utility of all the various additives is that these molecular entities include either nitrogen or oxygen within their structure, which serve to hydrogen bond with the water infused during the periods of high humidity, and which accordingly inhibits the diffusion and exsolvation of the water that leads to the formation of defects responsible for "fogging."

Generally speaking, a plastic scintillator radiation detector as described herein includes: one or more primary polymers present in an amount ranging from about 40 wt % to about 99 wt % (e.g. up to about 90 wt %, 95 wt %, or 99 wt %); one or more secondary polymers present in an amount ranging from about 1 wt % to about 60 wt %; and one or more fluors present in an amount ranging from about 0.1 wt % to about 50 wt %.

In various other embodiments, the one or more primary polymers and the one or more secondary polymers may be present in amounts satisfying a ratio ranging from about 95:5 to about 50:50 of the primary polymer(s) to the secondary polymer(s).

More specifically, and according to several nonlimiting but exemplary formulations, suitable plastic scintillator radiation detector compositions as described herein include the following embodiments.

According to a first exemplary embodiment, a plastic scintillator radiation detector composition includes approximately 1 wt %, 2,5-diphenyl oxazole (PPO), as a primary fluor; approximately 0.2-0.5 wt % Bis-MSB or POPOP as a secondary fluor; and a mixture of primary and secondary polymers present in an 85:15 ratio (primary:secondary). The mixture of primary and secondary polymer comprises the balance of the composition, and includes either polyvinyl toluene as the primary polymer and DVB as the secondary polymer, or polystyrene as the primary polymer and DVB as the secondary polymer.

According to a second exemplary embodiment, a plastic scintillator radiation detector composition includes approximately 1 wt % of 2,5-diphenyl oxazole (PPO) as a primary fluor; approximately 0.2-0.5 wt % Bis-MSB or POPOP as a secondary fluor; and a mixture of primary and secondary polymers present in an 80:20 ratio (primary:secondary). The mixture of primary and secondary polymer comprises the balance of the composition, and includes either polyvinyl toluene as the primary polymer and PMMA as the secondary polymer, or polystyrene as the primary polymer and PMMA as the secondary polymer.

According to a third exemplary embodiment, a plastic scintillator radiation detector composition includes approximately 10 wt % of 2,5-diphenyl oxazole (PPO) as a primary fluor and molecular additive; approximately 0.2-0.5 wt % Bis-MSB or POPOP as a secondary fluor; and the primary polymer comprises the balance of the composition. More generally, the use of 10 wt % PPO to suppress the crazing and/or fogging may be further supplemented by DVB and/or PMMA to further assure the environmental resilience of the scintillator plastic under extreme conditions.

According to a fourth exemplary embodiment, a plastic scintillator radiation detector composition includes approximately 1 wt % of a 2,5-diphenyl oxazole (PPO), as a primary fluor; approximately 0.2-0.5 wt % Bis-MSB or POPOP as a secondary fluor; and a mixture of primary and secondary polymers present in an 80:20 ratio (primary:secondary). However, according to the third exemplary embodiment, the secondary polymer comprises two components present in equal amounts, such that the ratio is 80:10:10 of the primary polymer:secondary polymer:cross-linker. The mixture includes either polyvinyl toluene as the primary polymer and roughly equal wt % amounts DVB and PMMA, or polystyrene as the primary polymer and roughly equal wt % amounts DVB and PMMA.

Figure 4:
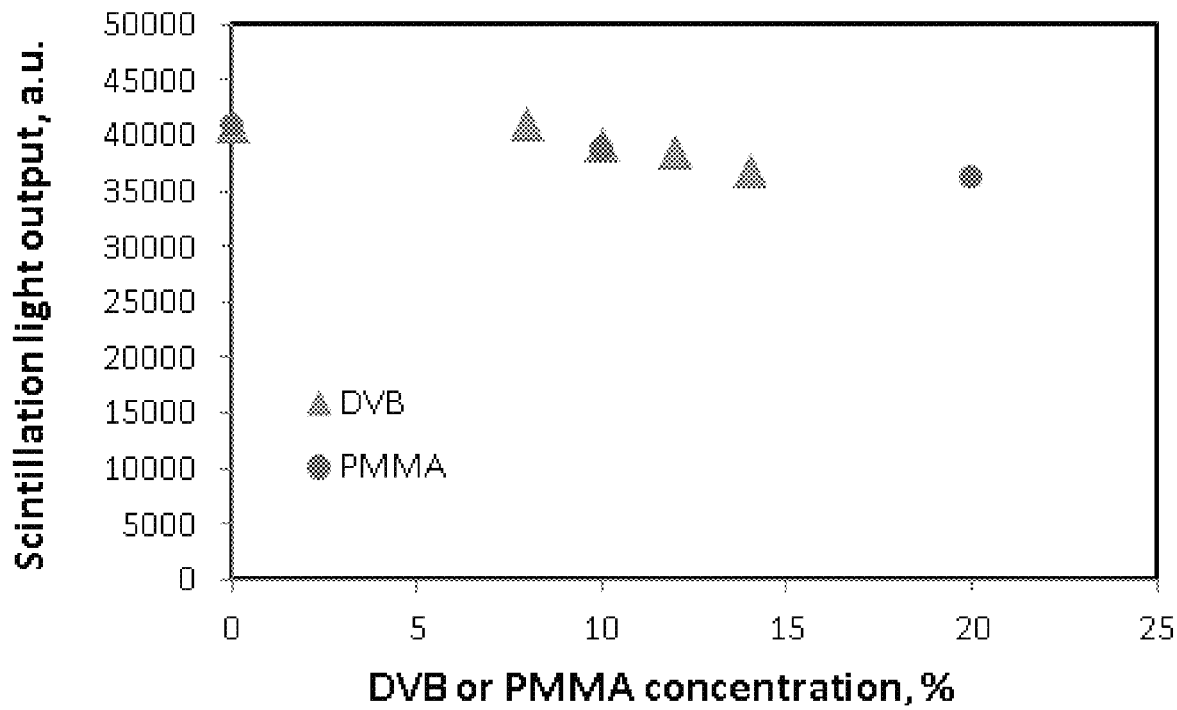
FIG. 4 is a graph depicting a relationship between scintillator light output and concentration of particular polymer components, according to one embodiment of the presently disclosed inventive concepts.

It should be noted that addition of secondary polymer to polystyrene and polyvinyl toluene undesirably results in a decrease in light output of the resulting optic. As shown in FIG. 4, increasing concentration of DVB or PMMA, in an optic employing polyvinyl toluene or polystyrene as the primary polymer and 1 wt % 2,5-diphenyl oxazole (PPO) as a fluor, corresponds to decreasing light output on the order of about 5-20%. This is expected in view of the inferior optical properties of nearly all suitable polymeric components relative to polystyrene and polyvinyl toluene, at least in the context of plastic scintillation radiation detectors. Accordingly, conventional wisdom would be to avoid introducing secondary polymer into a plastic scintillation radiation detector composition, particularly if attempting to improve the detection performance thereof. The incorporation of additional PPO on the order of 5-20 wt % has been observed to not lead a decrease in the light yield while improving the environmental robustness, and is thusly advantageous to include in the formulation.

However, in preferred embodiments of the presently disclosed inventive concepts, these shortcomings may be overcome or mitigated via incorporating novel fluors or combinations thereof, such as 7-diethylamino-4-methylcoumarin (MDAC), never before used in plastic scintillation radiation detector compositions. Other suitable fluors which may be utilized, which do not necessarily achieve the aforementioned mitigation or elimination of light output reduction in scintillators including secondary polymer, include: 2,5-diphenyl oxazole (PPO), para-terphenyl, 2-(4-Biphenylyl)-5-phenyl-1,3,4-oxadiazole (PBD), 1,4-Bis(2-methylstyryl)benzene (Bis-MSB), 1,4-bis(5-phenyloxazol-2-yl) benzene (POPOP), and/or 9,10-diphenylanthracene (DPA). In various embodiments, the foregoing exemplary fluors may be utilized in any suitable combination, and suitable equivalently functioning fluor(s) that would be understood by a person having ordinary skill in the art after reading these descriptions may also be employed, all without departing from the scope of the instant disclosure.

In various embodiments, and depending on the nature of the fluor and scintillating plastic, the amount of fluor may vary. For example, in pulse-shape discrimination (PSD) plastics used to detect neutrons that are distinguished from gamma photons, the amount of fluor may be in a range from about 0.1 wt % to about 50 wt %, while in non-PSD plastics the range may be from about 0.1 wt % to about 10 wt %. As referred-to herein, PSD plastics include, by way of nonlimiting example, any type of plastic known in the art as being capable of detecting neutrons distinctly from gamma photons.

Thus, in several exemplary embodiments, the scintillator may include one or more fluors, e.g. a primary fluor present in an amount of about 1 wt % to about 50 wt % (for non-PSD applications, the primary fluor is preferably present in an amount from about 1-10 wt %); and a secondary fluor present in an amount from about 0.1 wt % to about 1 wt %.

Figure 5:
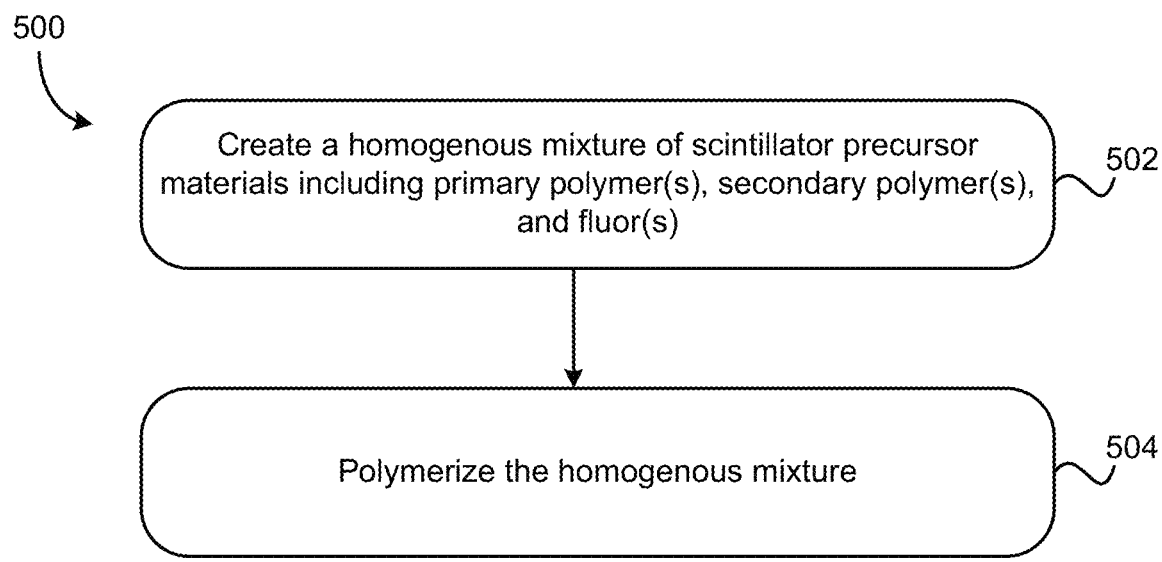
FIG. 5 is a flowchart of a method, according to one embodiment of the presently disclosed inventive concepts.

Turning now to particular methods of fabricating inventive detector structures as described herein, FIG. 5 shows a method 500 of making a plastic scintillation radiation detector that is robust to crazing and/or fogging following exposure to harsh environmental conditions including but not limited to water vapor and/or extreme temperature variation. The method 500 as presented herein may be carried out in any desired environment that would be appreciated as suitable by a person having ordinary skill in the art upon reading the present disclosure. Moreover, more or less operations than those shown in FIG. 5 may be included in method 500, according to various embodiments. It should also be noted that any of the aforementioned features may be used in any of the embodiments described in accordance with the various methods.

As shown in FIG. 5, method 500 includes at least operation 502, where a homogenous mixture of precursor materials is formed. The precursor materials include one or more primary polymers (or precursors thereof, e.g. monomers) present in an amount ranging from about 40 wt % to about 99 wt %; one or more secondary polymers (or precursors thereof, e.g. monomers) present in an amount ranging from about 1 wt % to about 60 wt %; and one or more fluors present in an amount ranging from about 0.1 wt % to about 50 wt %.

The various primary and secondary polymers and fluor(s) may include any suitable species described herein, as well as equivalents thereof that would be appreciated by persons having ordinary skill in the art upon reading the instant disclosures.

Similarly, the various precursor materials may be obtained from commercial sources and used as-provided, particularly where the precursors are high-purity-grade materials.

Homogenization may be performed using any suitable technique and apparatus. However, in preferred approaches, the mixture is combined in an environment devoid of oxygen, e.g. an atmosphere of molecular nitrogen or argon, or under a vacuum, to avoid undesirable interaction of the precursors with oxygen.

In operation 504, method 500 continues with polymerization of the homogenous mixture. Polymerization may be accomplished in any suitable manner, optionally using an initiator. In approaches where the mixture of precursor materials includes a polymerization initiator, e.g., 1,1-Bis(t-butylperoxy)-3,3,5-trimethylcyclohexane (also known as LUPEROX 231®), the initiator is preferably present in an amount from about 0.01 wt % to about 1 wt % of the precursor materials.

In preferred approaches, polymerization includes incubating the homogenous mixture at a temperature of approximately 60° C. for a period of approximately 1 day; incubating the homogenous mixture at a temperature of approximately 65° C. for a period of approximately 1 day; and incubating the homogenous mixture at a temperature of approximately 70° C. for a period of approximately 4 days. More preferably, the precursor materials are incubated in a glass vessel or other suitable container, and cooled to room temperature following polymerization. The final product may be obtained by breaking the glass vessel and extracting the polymerized optic.

However, as noted above, polymerization may be accomplished according to any suitable process that would be appreciated by a person having ordinary skill in the art upon reading the instant descriptions. The primary requirement is that the precursor mixture is fully polymerized following the process employed.

According to a first exemplary embodiment, a plastic scintillator radiation detector precursor mixture includes approximately 1 wt % 2,5-diphenyl oxazole (PPO), as a primary fluor; approximately 0.2-0.5 wt % Bis-MSB or POPOP as a secondary fluor; 0.1-1 wt % of Luperox 231 as polymerization initiator; and a mixture of primary polymers and cross-linker present in an 85:15 ratio. The mixture of primary polymer and cross-linker comprises the balance of the composition, and includes either polyvinyl toluene as the primary polymer and DVB as the secondary polymer, or polystyrene as the primary polymer and DVB.

According to a second exemplary embodiment, a plastic scintillator radiation detector precursor mixture includes approximately 1 wt % of 2,5-diphenyl oxazole (PPO) as a primary fluor; approximately 0.2-0.5 wt % Bis-MSB or POPOP as a secondary fluor; approximately 0.1-1% of Luperox 231 as polymerization initiator; and a mixture of primary and secondary polymers present in an 80:20 ratio (primary:secondary). The mixture of primary and secondary polymer comprises the balance of the composition, and includes either polyvinyl toluene as the primary polymer and PMMA as the secondary polymer, or polystyrene as the primary polymer and PMMA as the secondary polymer.

According to the third exemplary embodiment, a plastic scintillator radiation detector composition includes approximately 10 wt % of 2,5-diphenyl oxazole (PPO) as a primary fluor and molecular additive; approximately 0.2-0.5 wt % Bis-MSB or POPOP as a secondary fluor; approximately 0.01-2 wt % of Luperox 231 as polymerization initiator; and the primary polymer.

According to a fourth exemplary embodiment, a plastic scintillator radiation detector precursor mixture includes approximately 1 wt % of a 2,5-diphenyl oxazole (PPO), as a primary fluor; approximately 0.2-0.5 wt % Bis-MSB or POPOP as a secondary fluor; approximately 0.01-2 wt % of Luperox 231 as polymerization initiator, and a mixture of primary and secondary polymers present in an 80:20 ratio (primary:secondary). However, according to the fourth exemplary embodiment, the secondary polymer comprises two components present in equal amounts, such that the ratio is 80:10:10 of the primary polymer:secondary polymer:cross-linker. The mixture of primary with the secondary polymer and cross-linker comprises the balance of the composition, and includes either polyvinyl toluene as the primary polymer and equal wt % amounts DVB and PMMA, or polystyrene as the primary polymer and equal wt % amounts DVB and PMMA.

Figure 6:
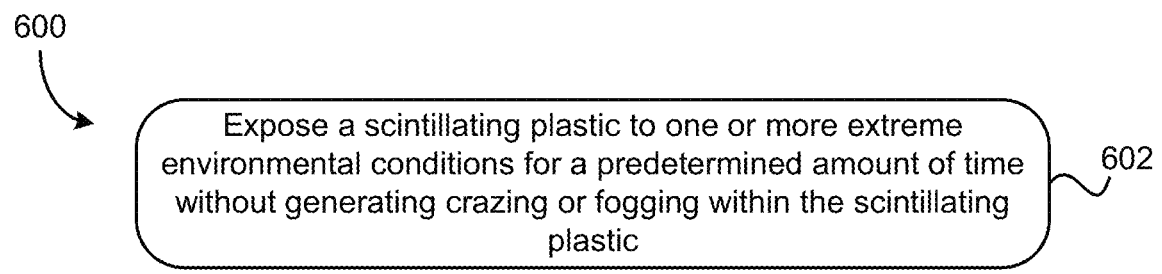
FIG. 6 is a flowchart of a method, according to one embodiment of the presently disclosed inventive concepts.

Referring now to FIG. 6, a method 600 of using plastic scintillation radiation detectors is shown, according to one embodiment. The method 600 as presented herein may be carried out in any desired environment that would be appreciated as suitable by a person having ordinary skill in the art upon reading the present disclosure. Moreover, more or less operations than those shown in FIG. 6 may be included in method 600, according to various embodiments.

More specifically, method 600 includes exposing a scintillating plastic as described herein to one or more extreme environmental conditions for a predetermined amount of time without generating crazing or fogging within the scintillating plastic, in operation 602. As noted above, the precise amount of time and/or temperature and humidity levels required to generate crazing or fogging may vary according to the size (and particularly the volume and surface area) of the plastic. Accordingly, the amount of time required to generate crazing or fogging may be determined by exposing an otherwise identical composition lacking secondary polymer(s) to the same environmental conditions. In general, the greater the volume of the optic, and the lower the surface area, the longer the optic must be exposed to extreme conditions in order to "saturate" with defects.

In practice, the inventors have observed that defects may arise from crazing and/or fogging in as little as several hours, e.g. in the case of high-magnitude temperature swings (~100° C. change such as from 55° C. to −40° C.), or exposure to saturated water vapor at elevated temperature (e.g. about 50° C.), for optics of similar shape and size as shown in FIGS. 3A-3E. Without wishing to be bound to any particular theory, lower limits of exposure to extreme environmental conditions that cause crazing and/or fogging in conventional polyvinyl toluene-based and/or polystyrene-based optics have been observed under conditions including at room temperature and ambient humidity. The lower limit for the generation of as small amount of fogging can be observed in conventional plastics operating for few days in high humidity (>80%) with the temperature swings of ~30° C. (e.g. fast temperature decrease from 55° C. to the RT, or from RT to −10° C.).

Regardless, in accordance with method 600, using the scintillating plastic to detect radiation from a radiation source prior to and after exposing the scintillating plastic to one or more extreme environmental conditions is characterized by a detection efficiency of the scintillating plastic being substantially the same before and after exposure to the extreme environmental conditions. Put another way, signal strength from the detector generated in response to radiation from the source may be unchanged following exposure to the extreme environmental conditions.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A scintillating plastic resistant to crazing and fogging, the scintillating plastic comprising:
   one or more primary polymers present in an amount ranging from about 40 wt % to about 95 wt %;
   one or more secondary polymers present in an amount ranging from about 1 wt % to about 60 wt %, wherein the one or more secondary polymers comprise a cross-linker and a polymer; and
   one or more fluors present in an amount ranging from about 0.1 wt % to about 50 wt %.

2. The scintillating plastic as recited in claim 1, wherein the one or more primary polymers are selected from the group consisting of: polyvinyl toluene (PVT), polystyrene (PS), poly($\alpha$-methylstyrene), a polymer formed by polymerizing dimethylstyrene, and a polymer formed by polymerizing trimethylstyrene.

3. The scintillating plastic as recited in claim 1, wherein at least some of the primary polymers are crosslinked to at least some of the polymer of the secondary polymers via the cross-linker.

4. The scintillating plastic as recited in claim 3, wherein the cross-linker is selected from the group consisting of: divinylbenzene (DVB), ethylene glycol diacrylate, ethylene glycol derivatives, ethylene glycol dimethacrylate, and ethylene glycol dimethacrylate derivatives.

5. The scintillating plastic as recited in claim 1, wherein the polymer of the one or more secondary polymers is selected from the group consisting of: acrylic acid and derivatives thereof; methacrylic acid and derivatives thereof; and oxygen-bearing allyls.

6. The scintillating plastic as recited in claim 1, wherein the one or more fluors comprise:
   a primary fluor present in an amount ranging from about 1 wt % to about 50 wt %; and
   a secondary fluor present in an amount ranging from about 0.1 wt % to about 1 wt %.

7. The scintillating plastic as recited in claim 1, wherein the one or more fluors are selected from a group consisting of: 2,5-diphenyl oxazole (PPO); para-terphenyl; 2-(4-Biphenylyl)-5-phenyl-1,3,4-oxadiazole (PBD); 1,4-Bis(2-methylstyryl)benzene (Bis-MSB); 1,4-bis(5-phenyloxazol-2-yl)benzene (POPOP); 9,10-diphenylanthracene (DPA); and 7-diethylamino-4-methylcoumarin (MDAC).

8. The scintillating plastic as recited in claim 1, wherein the one or more primary polymers and the one or more secondary polymers are present in amounts satisfying a ratio ranging from about 95:5 to about 50:50 of the primary polymers to the secondary polymers.

9. The scintillating plastic as recited in claim 1, wherein the cross-linker comprises divinylbenzene (DVB);
   wherein the polymer comprises polymethylmethacrylate (PMMA); and
   wherein the cross-linker and the polymer are present in equal amounts.

10. The scintillating plastic as recited in claim 1, wherein at least some of the primary polymers are crosslinked to one another via the cross-linker; and
    wherein at least some of the polymer of the secondary polymers are crosslinked to one another via the cross-linker.

11. The scintillating plastic as recited in claim 1, wherein the one or more primary polymers comprise polyvinyl toluene (PVT) and/or polystyrene (PS);
    wherein the one or more secondary polymers comprise polymethylmethacrylate (PMMA);
    wherein at least some of the primary polymers are cross-linked to at least some of the polymer of the secondary polymers via the cross-linker; and
    wherein the cross-linker comprises divinylbenzene (DVB).

12. The scintillating plastic as recited in claim 11, wherein the one or more fluors comprise:
    PPO as a primary fluor; and
    a secondary fluor comprising either bis-MSB or POPOP.

13. The scintillating plastic as recited in claim 12, wherein the PPO is present in an amount of about 1 wt %; and
    wherein the secondary fluor is present in an amount from about 0.2 wt % to about 0.5 wt %.

14. A method of forming a scintillating plastic resistant to crazing and fogging, the method comprising:
    creating a homogenous mixture of precursor materials, the homogenous mixture comprising:
      one or more primary polymers or monomers present in an amount ranging from about 40 wt % to about 99 wt %;
      one or more secondary polymers or monomers present in an amount ranging from about 1 wt % to about 60 wt %, wherein the one or more secondary polymers or monomers comprise a cross-linker; and
      one or more fluors present in an amount ranging from about 0.1 wt % to about 50 wt %; and
    polymerizing the homogenous mixture, wherein the polymerizing comprises:
      incubating the homogenous mixture at a temperature of approximately 60° C. for a period of approximately 1 day;
      incubating the homogenous mixture at a temperature of approximately 65° C. for a period of approximately 1 day; and
      incubating the homogenous mixture at a temperature of approximately 70° C. for a period of approximately 4 days.

15. A method, comprising:
    exposing a scintillating plastic to one or more extreme environmental conditions for at least two hours without generating crazing or fogging within the scintillating plastic; and
    wherein the extreme environmental conditions comprise:
      a temperature swing of about 20° C. or more; and
      exposure to humidity in an amount of about 70% or more.

16. The method as recited in claim 15, wherein the scintillating plastic comprises:
    one or more primary polymers present in an amount ranging from about 40 wt % to about 99 wt %;
    one or more secondary polymers present in an amount ranging from about 1 wt % to about 60 wt %, wherein the one or more secondary polymers comprise a cross-linker; and
    one or more fluors present in an amount ranging from about 0.1 wt % to about 50 wt %; and wherein at least some of the primary polymers are cross-linked to at least some of the secondary polymers via the cross-linker.

17. A scintillating plastic resistant to crazing and fogging, the scintillating plastic comprising:
one or more primary polymers present in an amount ranging from about 40 wt % to about 95 wt %;
one or more secondary polymers present in an amount ranging from about 1 wt % to about 60 wt %; and
one or more fluors present in an amount ranging from about 0.1 wt % to about 50 wt %; and
wherein the one or more fluors comprise 7-diethylamino-4-methylcoumarin (MDAC).

* * * * *